United States Patent
Lempke

[11] 3,881,304
[45] May 6, 1975

[54] DUMPABLE GRASS CATCHER

[75] Inventor: Leslie C. Lempke, Bloomfield Hills, Mich.

[73] Assignee: Homelawn Corporation, Detroit, Mich.

[22] Filed: May 9, 1973

[21] Appl. No.: 358,538

Related U.S. Application Data

[63] Continuation-in-part of Ser. No. 210,061, Dec. 20, 1971, abandoned.

[52] U.S. Cl. .................................................. 56/202
[51] Int. Cl. ............................................ A01d 35/22
[58] Field of Search .......... 56/16.6, 194, 200, 202, 56/203, 320.2; 24/205 B

[56] References Cited
UNITED STATES PATENTS

| | | | |
|---|---|---|---|
| 2,210,547 | 8/1940 | Hoffman | 24/205 B |
| 3,014,330 | 12/1961 | Oberdick | 56/16.6 |
| 3,099,123 | 7/1963 | Price | 56/320.2 X |
| 3,143,842 | 8/1964 | Mattson et al. | 56/202 |
| 3,197,949 | 8/1965 | Waag | 56/202 |
| 3,386,234 | 6/1968 | Leader | 56/202 |
| 3,421,302 | 1/1969 | Dahl | 56/202 |
| 3,492,800 | 2/1970 | Peterson et al. | 56/202 |
| 3,494,116 | 2/1970 | Leupke | 56/202 |
| 3,499,275 | 3/1970 | Lozen | 56/202 |
| 3,503,192 | 3/1970 | Berg et al. | 56/202 |
| 3,553,947 | 1/1971 | Root | 56/202 |
| 3,561,201 | 2/1971 | Dahl | 56/202 |
| 3,579,966 | 5/1971 | Allina | 56/202 |
| 3,724,186 | 4/1973 | Mattson | 56/202 |

Primary Examiner—Russell R. Kinsey
Attorney, Agent, or Firm—Bruce G. Klaas, Esq.

[57] ABSTRACT

A catcher apparatus for a lawn mower or the like comprising a pivotally and removably mounted elongated support arm having a catcher with a rear outlet opening attached thereto for movement between a horizontal catching position and a vertical dumping position.

62 Claims, 18 Drawing Figures

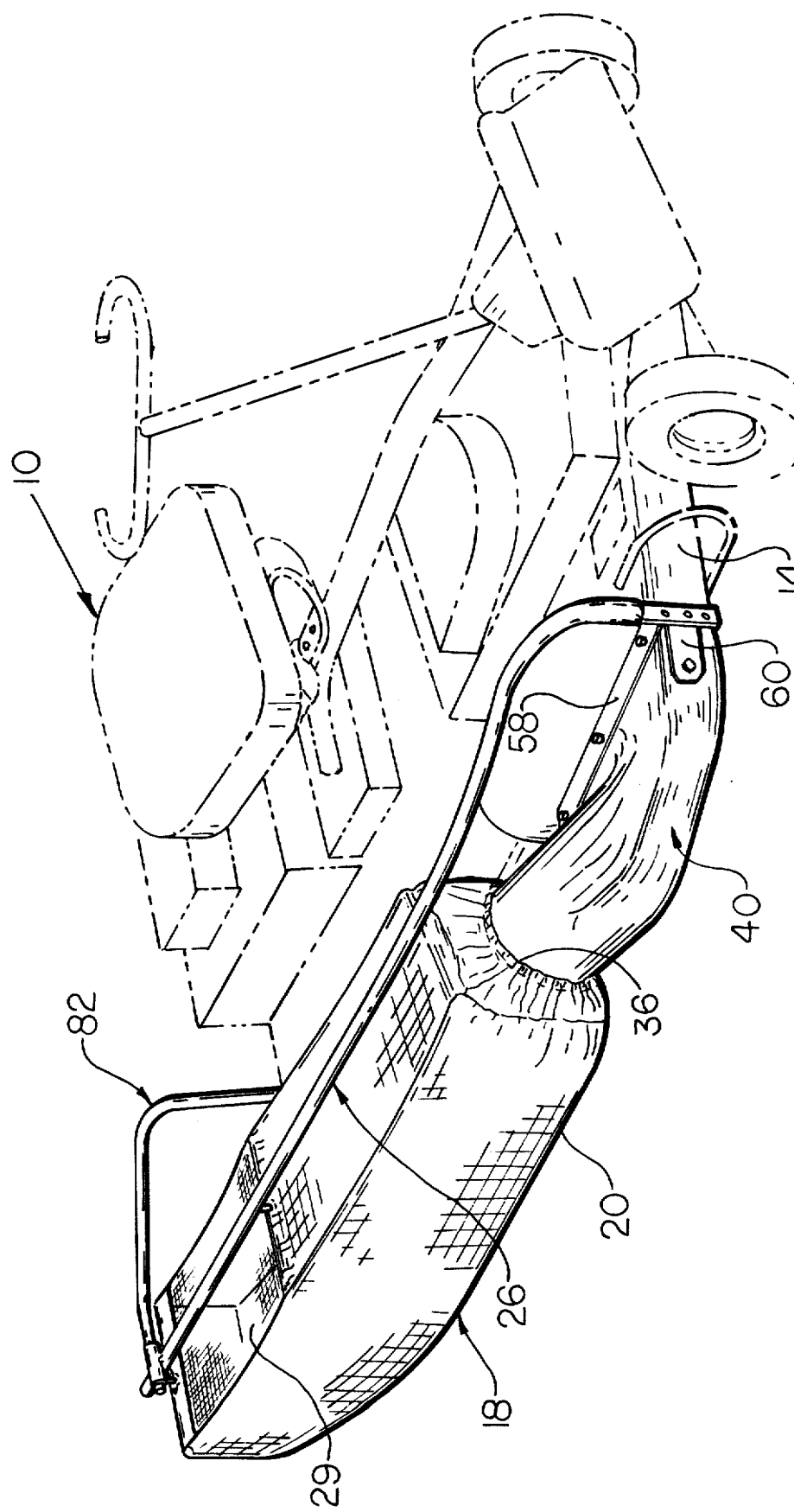

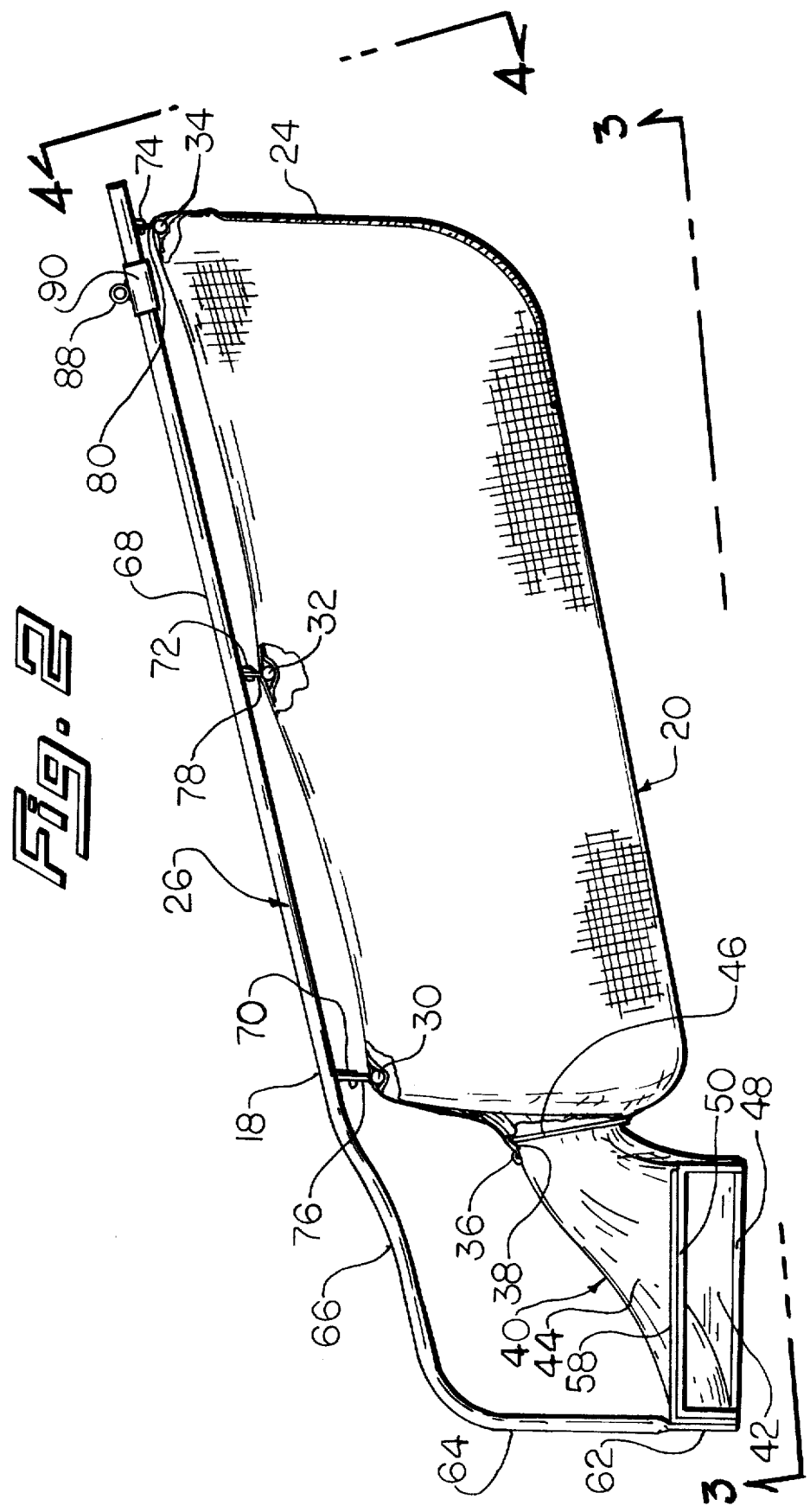

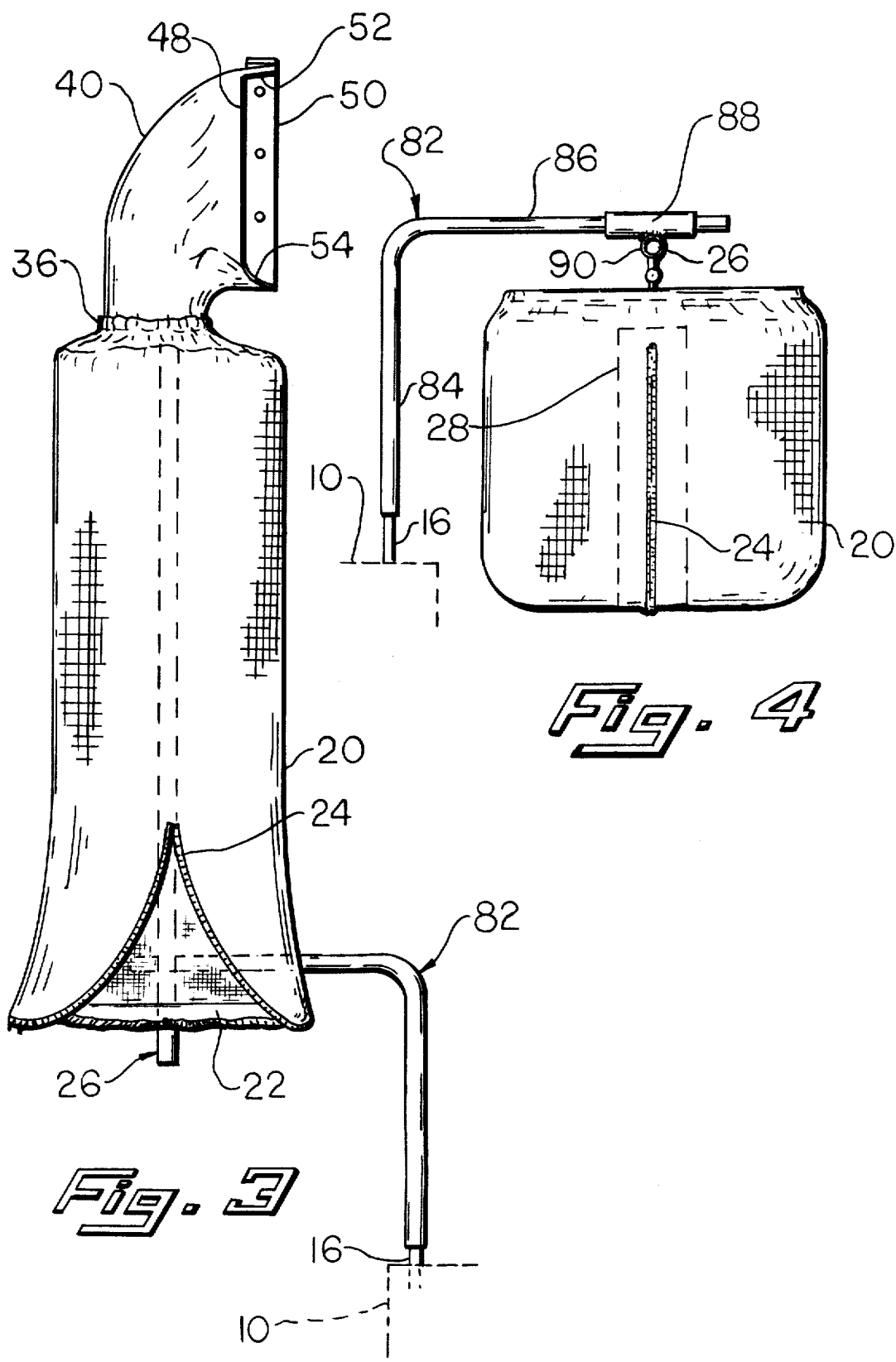

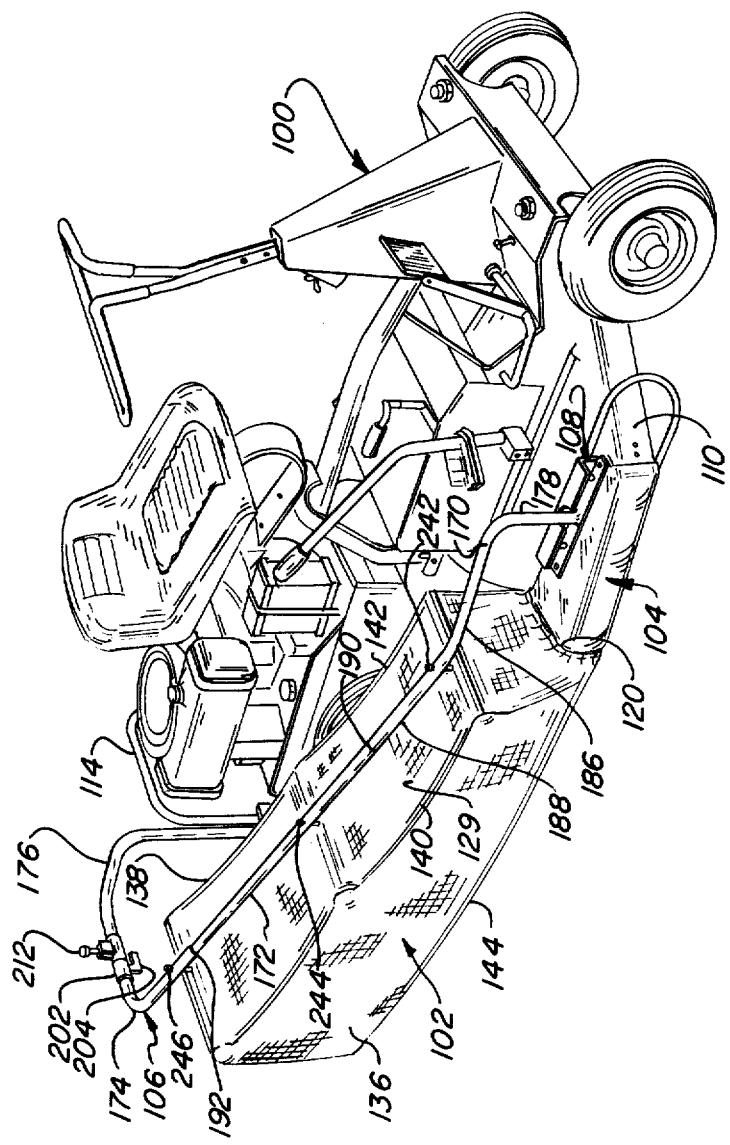

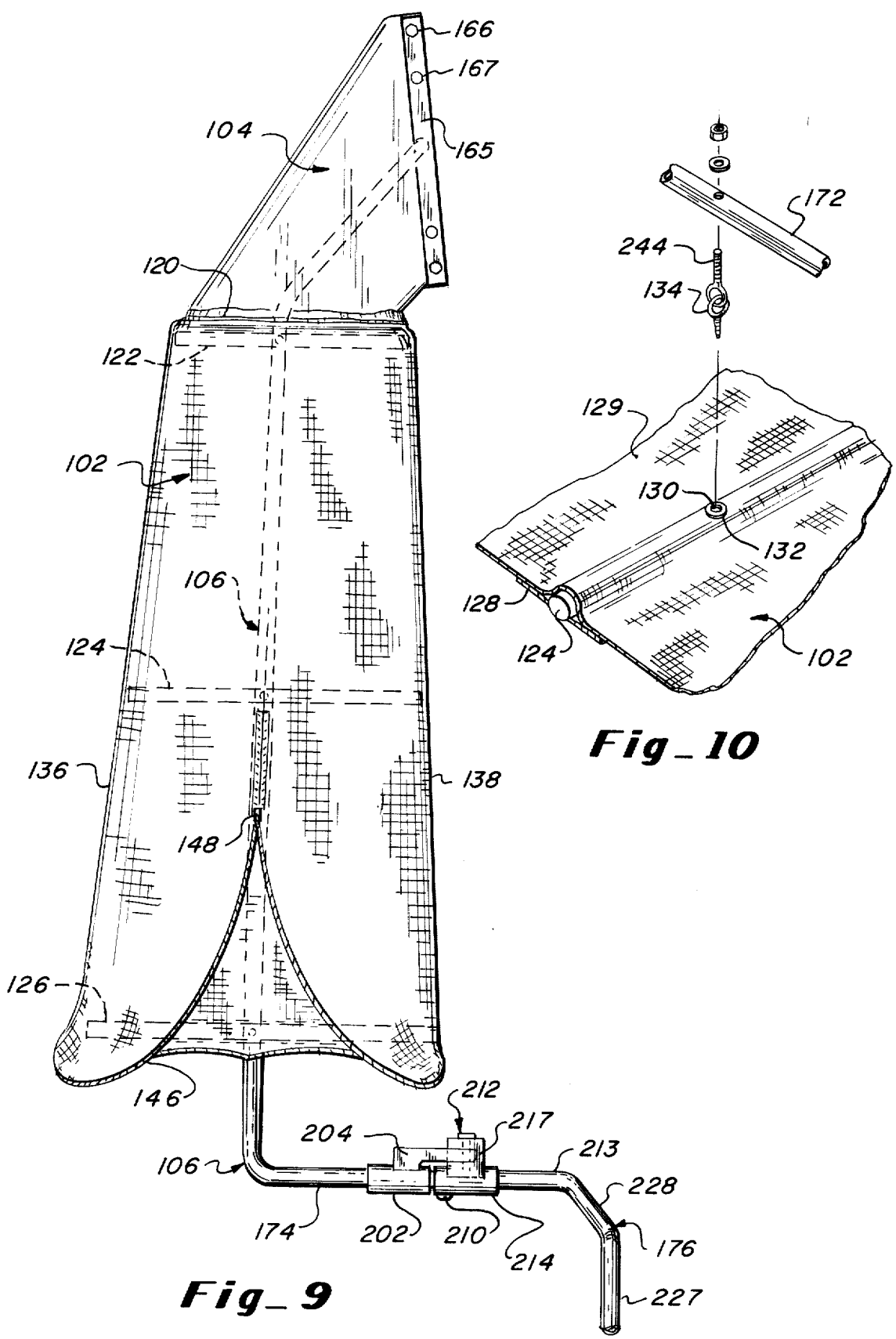

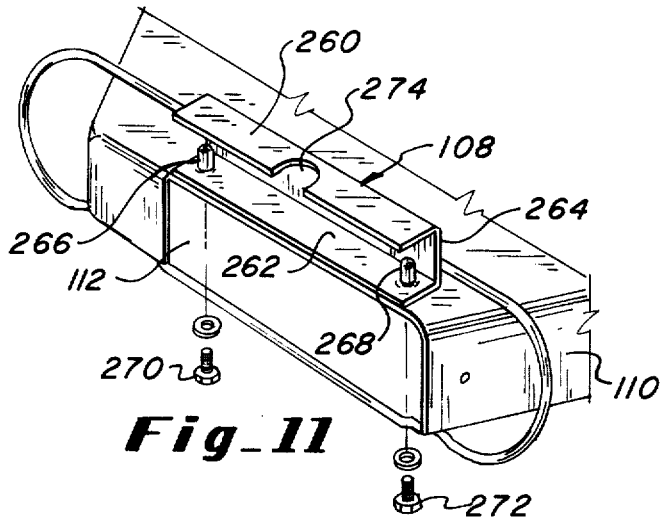
Fig_11
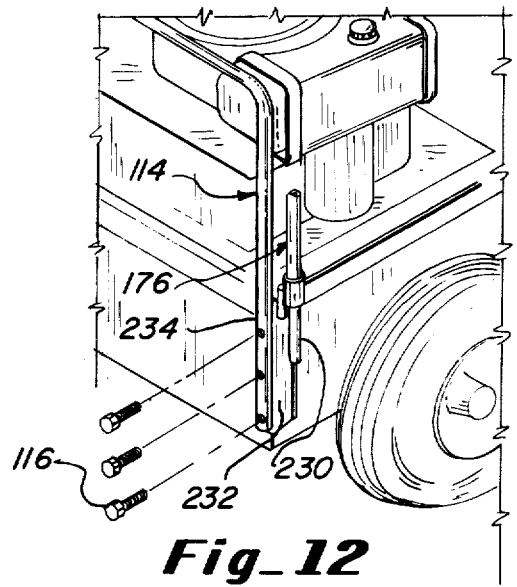
Fig_12
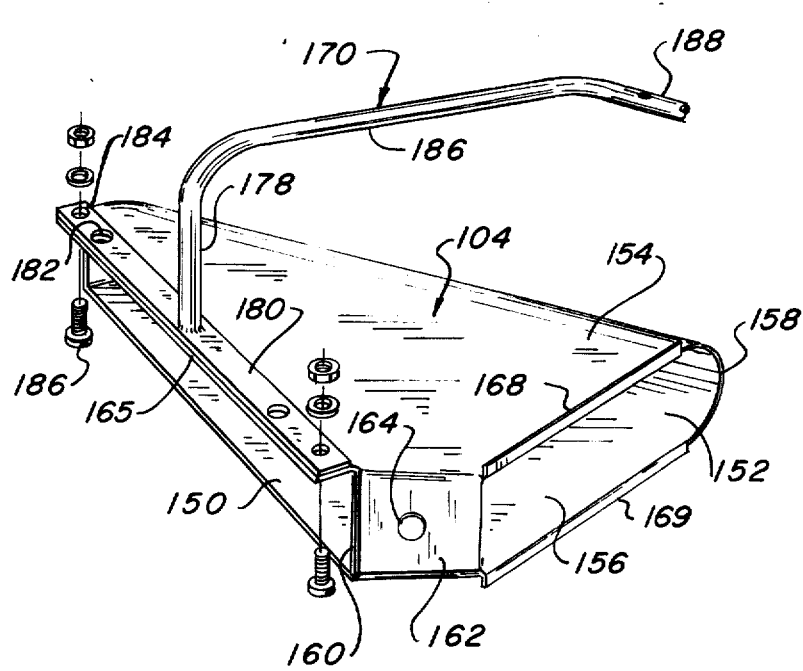
Fig_14
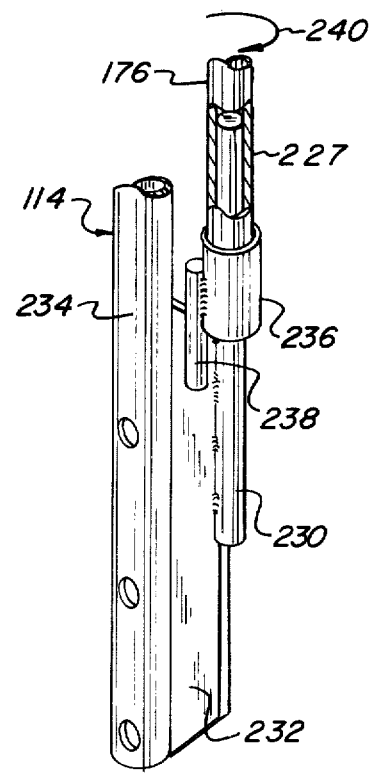
Fig_13

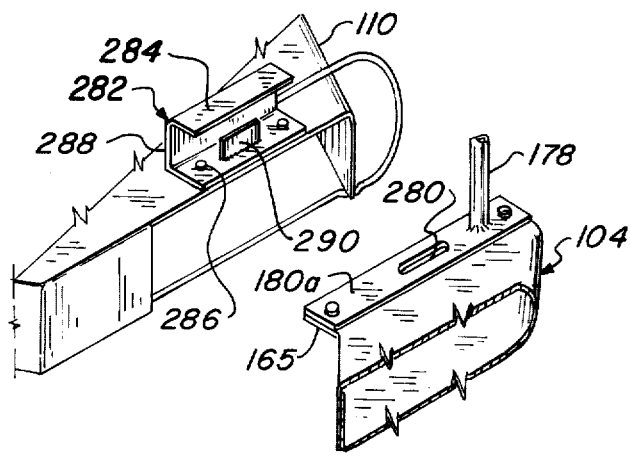
Fig_17
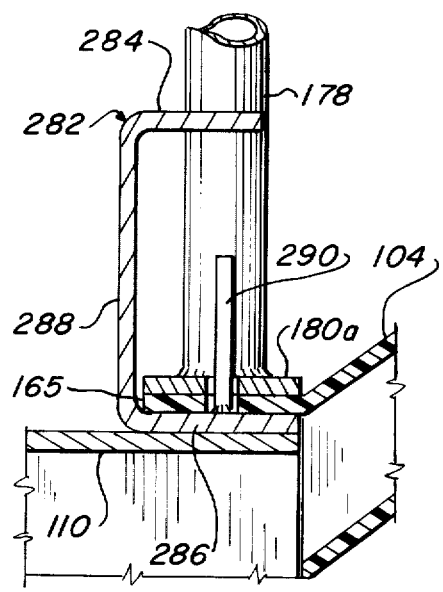
Fig_18
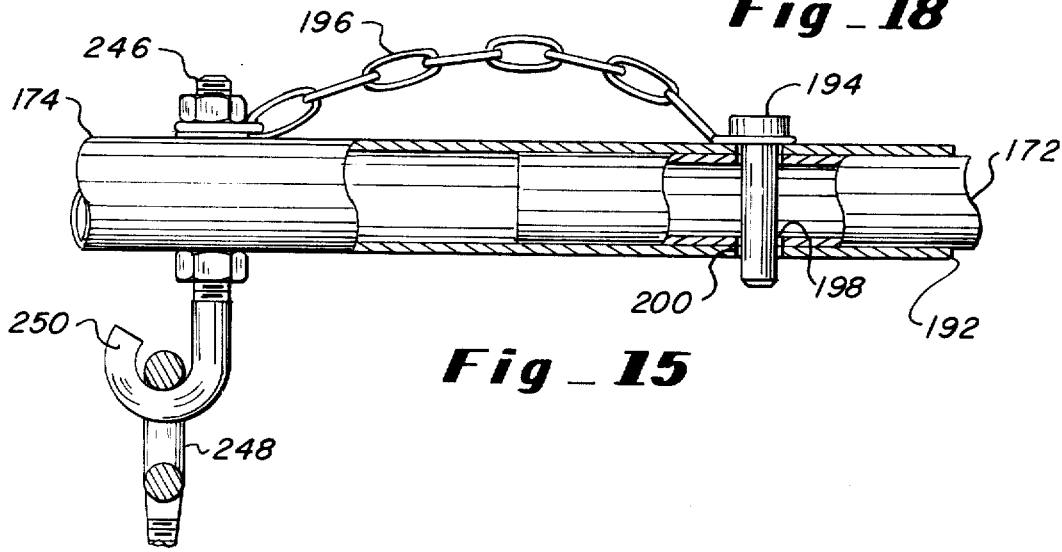
Fig_15
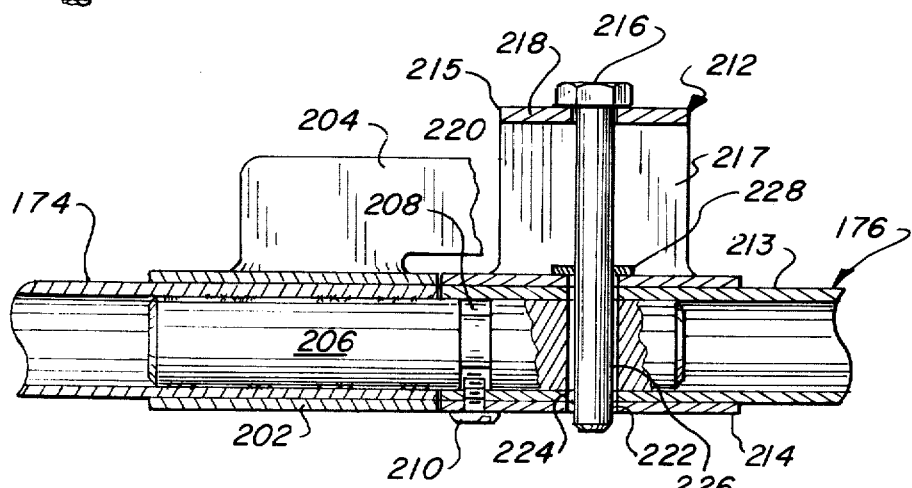
Fig_16

DUMPABLE GRASS CATCHER

This application is a continuation-in-part of my prior U.S. application Ser. No. 210,061 filed Dec. 20, 1971, now abandoned.

BACKGROUND AND SUMMARY OF INVENTION

This invention relates generally to leaf and grass catcher apparatus for lawn mowers. In recent years, considerable effort has been devoted to development of lawn maintenance equipment which will enable the catching of leaf and grass materials as they are discharged from a power mower with a minimum of effort directed to mounting, dismounting, and emptying of the catcher apparatus. Nonetheless, present catcher apparatus still requires considerable manipulation and association of various elements to attach and detach the catcher relative to the mower as well as to empty the contents. Consequently, emptying of the catcher apparatus is usually an annoying if not a difficult and time-consuming chore.

The primary purpose of the present invention is to provide means to facilitate the attachment, detachment, and emptying of catcher apparatus on a mower. To this end, the entire catcher apparatus is mounted on the mower for pivotal movement as a unit between a generally horizontal catching position and a generally vertical dumping position. In the presently preferred embodiment, the catcher apparatus comprises an elongated rigid support means pivotally connected to the mower and supporting a container in the catching and dumping positions. The rigid support means may also be removably connected to the mower and utilized as a carrying handle to transport the container to a remote dumping position or to place the container in dumping association with a trash can or bag. The container has a rearwardly facing inlet opening at the rear end and a generally forwardly facing inlet opening at the front end which is removably associated with a discharge chute or the like extending upwardly and rearwardly from the discharge opening on the mower. Suitable openable and closable fastening means are associated with the outlet opening of the container to permit selective dumping of the container in a generally vertical dumping position. The container may be a cloth bag having a drawstring at the inlet for association with the discharge chute and a zipper or snap fastener at the outlet opening. It is preferable that the front of the bag be of smaller cross-section than the rear of the bag with the outlet opening extending across the entire width of the rear of the bag to facilitate dumping.

THE DRAWING

FIG. 1 is a perspective view of catcher apparatus embodying the principles of the present invention and shown in association with a riding type rotary cutter power mower;

FIG. 2 is a side elevational view of the catcher apparatus of FIG. 1 in a catching position;

FIG. 3 is a front elevational view of the catcher apparatus of FIG. 1 in a dumping position;

FIG. 4 is an end view of the catcher apparatus of FIG. 1;

FIG. 8 is a perspective view of a presently preferred form of grass catcher unit shown in a catching position mounted in association with another conventional riding type lawn mower;

FIG. 9 is a front elevational view of the catcher unit of FIG. 8 in a vertical dumping position;

FIG. 10 is an enlarged exploded perspective view of a portion of the catcher unit of FIG. 8 showing apparatus for attachment of a bag to support tube members;

FIG. 11 is an enlarged exploded perspective view of another portion of the grass catcher unit of FIG. 8 showing apparatus for removably mounting a chute on a mower blade housing;

FIG. 12 is an enlarged exploded perspective view of another portion of the catcher unit of FIG. 8 showing apparatus for pivotally mounting the catcher unit on the rear of the mower;

FIG. 13 is an enlarged perspective view of a portion of the apparatus shown in FIG. 12;

FIG. 14 is an enlarged exploded perspective view of another portion of the catcher unit of FIG. 8 showing a chute and a chute support member;

FIG. 15 is an enlarged side elevational view of a portion of the apparatus of FIG. 8, partly in section, showing apparatus for connecting tubular support members and mounting a bag thereon;

FIG. 16 is an enlarged side elevational view of a portion of the apparatus of FIG. 8, partly in section, showing apparatus for pivotally connecting tubular support members and for latching the support members in the vertical dumping position of FIG. 9;

FIG. 17 is an enlarged perspective view of alternative apparatus for removably mounting a chute on a mower blade housing; and FIG. 18 is an enlarged cross-sectional view of a portion of the type of apparatus shown in FIG. 17 and illustrating a plastic chute.

DETAILED DESCRIPTION

Figure 7:
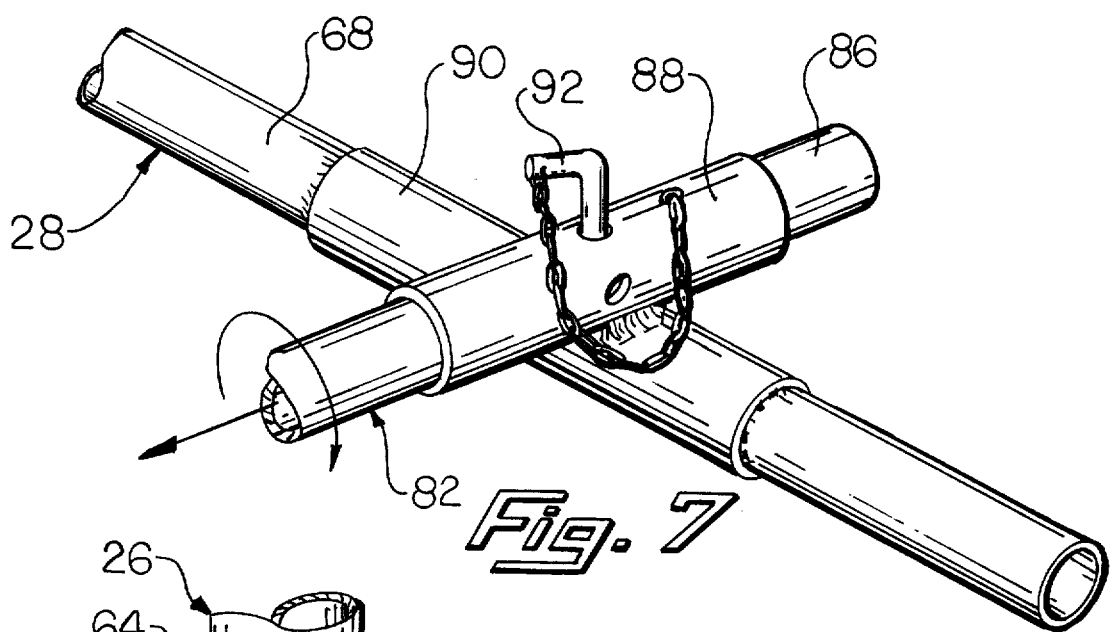
FIG. 7 is an enlarged partial perspective view of the pivotal connection between the catcher apparatus and the mower.
Figure 6:
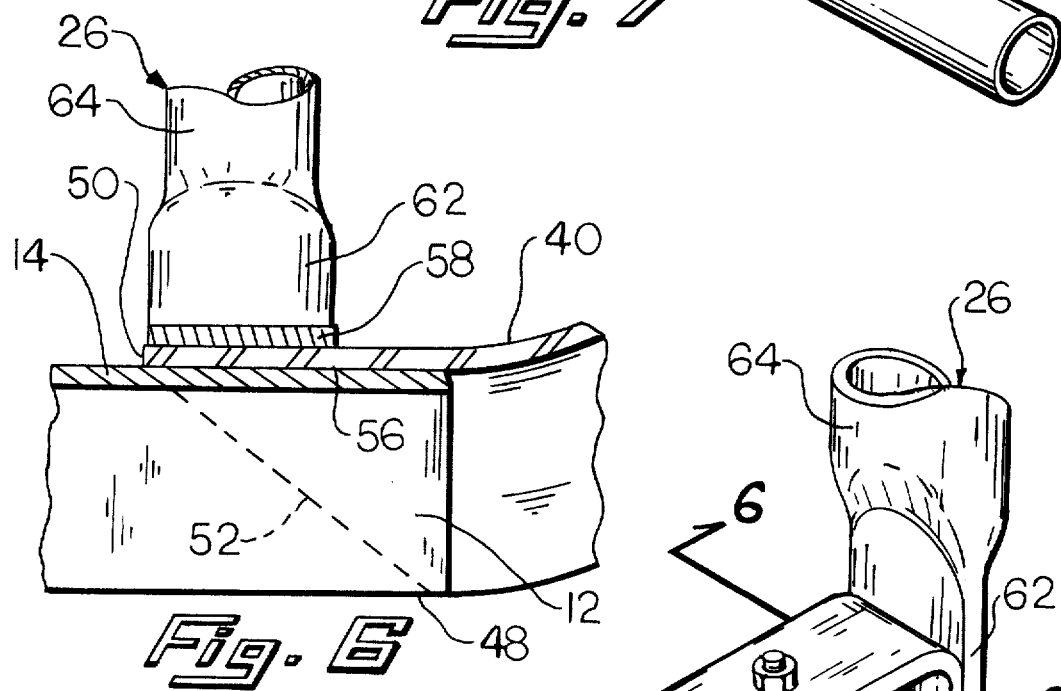
FIG. 6 is a cross-sectional view taken along the line 6—6 in FIG. 5.

FIG. 1 illustrates a conventional riding type rotary blade power lawn mower 10, such as manufactured by the McDonough Power Equipment Company, Inc. of McDonough, Georgia, having a discharge opening 12 on one side of a blade housing 14 and an upwardly extending support rod 16 attached to the rear of the mower frame on the same side.

A catching unit 18 is removably and pivotally mounted along the side of the mower to catch grass, leaves, or other debris thrown from the blade housing through the discharge opening.

An elongated cloth bag 20 of the general type disclosed in my prior U.S. Pat. No. 3,494,116, but having a rearwardly facing outlet opening 22 closed by suitable fastening means such as a zipper 24, is removably mounted on elongated rod-like support means 26. The outlet opening preferably extends downwardly across the rear wall of the bag and then forwardly along the bottom of the bag a sufficient distance to provide an opening area larger than the cross-sectional area of the bag. I have found it to be advantageous to provide a protective flap 28 on the inside of the bag along the zipper to cover the zipper during filling of the bag and facilitate opening of the bag when full. The flap may be sewn to the bag along one side so as to be readily movable out of the way during dumping and over the zipper during filling under the influence of the air stream flowing through the bag from the mower discharge opening and outwardly through a screen covered outlet opening 29 at the top rear of the bag. As described in detail in the prior patent, the cloth bag is attached to front, middle, and rear cross bars 30, 32, 34 which are interconnected by tensionable chain elements (not shown). A drawstring or elastic band 36 encircles an inlet opening 38 at the front of the bag for securing the bag to a discharge chute 40.

Figure 5:
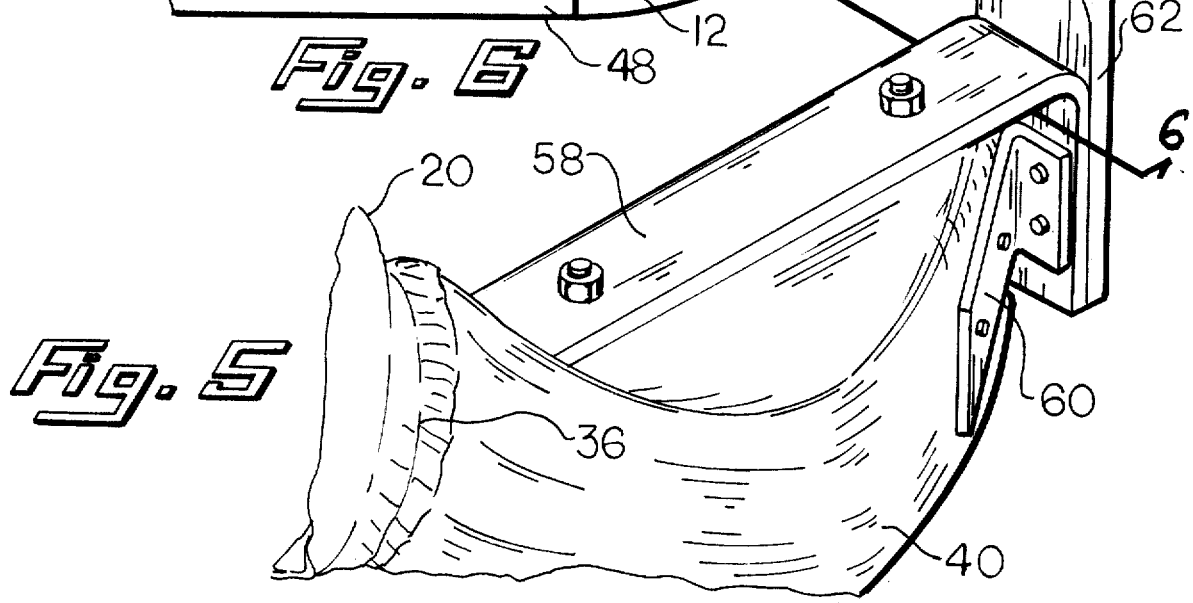
FIG. 5 is an enlarged partial perspective view of the front end of the catcher apparatus.

The discharge chute is made of high strength lightweight molded plastic material. A generally rectangular side facing inlet opening 42 is connected by a tubular body portion 44 to a generally circular rearwardly facing outlet opening 46. The edge of the bottom wall 48 is recessed relative to the edge of the top wall 50 and connected thereto by recessed side wall portions 52, 54 to permit the discharge chute to be associated with and disassociated from the mower discharge opening by downward and upward movement relative thereto. In the catching position, the underside 56 of the top wall 50 provides abutment surface means which abuts the top side of mower housing 14 along the discharge opening 12 and rigidly supports the catcher apparatus thereon. I have found it to be desirable to rigidify the plastic discharge chute around the inlet opening by providing a generally L-shaped metallic bracket 58 extending along the top and forward edges thereof and fixedly secured thereto by suitable fastener means. In addition, another generally L-shaped metallic bracket 60 extends along the curved front side wall and is fixed thereto by suitable fastening means. The forward end of the bracket is fixedly attached to the forward end of bracket 58 as shown in FIG. 5.

The elongated support means 26 is formed from a rigid metallic tube of cylindrical cross-sectional configuration with a first generally vertically extending flattened portion 62 fixedly attached to the discharge chute 40 and the brackets 58, 60 by suitable fastening means. A second generally vertically extending tubular portion 64 is connected to an upwardly outwardly and rearwardly curved portion 66 extending over and around the discharge chute 40 to a straight upwardly and rearwardly extending bag supporting portion 68.

The bag is removably attached to and supported by the metallic tube 26 by means of downwardly extending hooks 70, 72, 74 threaded into or otherwise mounted on the tube and eyelets 76, 78, 80 threaded into or otherwise mounted on the cross bars 30, 32, 34, respectively.

The rear end of the tube is pivotally and removably supported by the mower post 16 by means of a rigid tubular metallic support arm 82 of cylindrical cross-sectional configuration. A vertically extending portion 84 of the support arm is telescopically mounted on post 16 and a horizontally extending portion 86 is telescopically slidably mounted in a tubular coupling 88 fixed in transverse relationship to a tubular coupling 90 fixed to the support rod 26. Thus, the support rod 26 is pivotally supported on the support arm 82 for pivotal movement between the catching position of FIG. 1 and the dumping position of FIG. 3 by arcuate movement of the discharge chute relative to the mower housing and rotating movement of the tubular coupling relative to the support arm portion 86. In addition, the catching unit is completely removable from the mower by outward sliding movement of the discharge chute relative to the mower housing and of the tubular coupling 88 relative to the support arm portion 86.

In the illustrative embodiment, holding means in the form of a pin 92 cooperable with alignable holes in the tubular coupling 88 and the support arm portion 86 are provided to fixedly hold the support rod in any one of the positions.

Thus, when the bag has been filled with debris, it may be emptied on the mower by pivotally moving the support rod, which carries the attached bag and discharge chute, to the vertical position of FIG. 3. Thus, the front of the catcher unit is raised and the rear of the unit is lowered. The contents of the bag may be dumped on the ground or into a container such as a trash can or trash bag which may be prepositioned beneath or on the bag or moved into position after the bag is in the dumping position. It may be noted that the pivotal axis is located rearwardly of the center of the support member so that a substantial clearance is provided between the bottom of the bag and the ground. The zipper on the rear end of the bag may be opened prior to or after the pivotal movement to the dumping position. In some instances, I have found it to be most convenient to open the zipper part way before the pivotal movement and then to fully open the zipper in the dumping position.

The contents may also be dumped by removing the catcher unit from the mower by generally horizontal outward displacement. The support rod very conveniently serves as a carrying handle for the catcher unit and may be used to carry and then hold the bag in a vertical dumping position at a remote dumping site whether it be on the ground or into a trash container. The entire catching unit is relatively light in weight since the bag is cloth, the discharge chute is plastic, and the support rod and arm are tubular. The metallic parts may be made of aluminum or other relatively lightweight material.

The aforedescribed catcher unit is relatively easy to empty as compared with other catcher apparatus. It appears that the ease of emptying is related to the concept of rearward downward dumping through an outlet opening which is larger than the inlet opening and the removal of stresses which would tend to impede dumping. Since the grass or other debris is blown into the bag from front to rear, it is much easier to dump in the same direction than to dump in the reverse direction, which is the situation with a front dumping bag. In addition, since the bag remains on the support rod during dumping, it is held in a more open position throughout without collapsing, as is the situation when the filled bag is separately handled. The provision of the flap in front of the outlet opening reduces the pressure exerted by the contents against the fastening means and keeps the contents from becoming jammed in the zipper to facilitate opening of the bag for dumping.

Referring now to FIGS. 8–18 an improved and presently preferred embodiment of the inventive concepts is shown to comprise a riding type, rotary blade, side discharge, lawn mower 100, a catching bag 102, a discharge chute 104, bag and chute support means 106, and chute - mower attachment bracket means 108.

The lawn mower, which is of conventional construction, comprises a blade housing 110, mounted intermediate the front and rear wheels of the mower, having a side discharge opening 112, FIG. 11, and a rear mounted support member 114 of tubular construction attached to the mower frame by suitable fastening means 116 as shown in FIG. 12.

The catching bag 102 is made of commercially available woven ballistic material which is sufficiently porous to permit air discharge therethrough while being sufficiently strong to pass current safety requirements. An inlet opening 120 at the front of the bag is mounted in closed circumjacent relationship relative to the rear of the discharge chute 104 by suitable fastening means such as an integral elastic band or a drawstring as is well known in the art. Transverse bag spreading and support members 122, 124, 126, which may be made from wooden dowel rods or the like, are mounted within sleeves 128, FIG. 10, fixedly sewn inside the top bag wall 129 at front, intermediate, and rear portions of the bag. An access opening 130 is centrally provided in the bag by a metal eyelet 132 so as to permit an eyescrew 134 to be threadably mounted in a pre-drilled transverse hole (not shown) in the center of each dowel rod which extends beneath the top surface 129 of the bag substantially from one side bag wall 136 to the opposite side bag wall 138. Sewn seams 140, 142, which join the side walls 136, 138 to the top wall 129, as well as the material itself, effectively provide stretchable tensionable means whereby the top wall of the bag may be mounted in a spread tensioned manner beneath the support means 106. In the presently preferred embodiment, the bag side walls 136, 138 and bottom wall 144 may be made from one piece of material so as to have a somewhat U shaped cross-section. In addition, the cross-section of the bag gradually increases from a relatively small cross-section at the front to a relatively large cross-section at the rear such that the lengths of support members 122, 124, 126 are most advantageously varied between, for example, 10, 12 and 14 inches, respectively. Preferably the bottom wall 144 of the bag is also tapered downwardly rearwardly from the chute 104 so that the rear end of the bag is much larger than the rest of the bag. An outlet opening 146, FIG. 9, including a covering flap as previously described and closable by a zipper 148, is provided across the rear wall of the bag, from top to bottom and forwardly along the rear portion of the bag bottom wall.

The discharge chute 104, FIG. 14, is made of one piece of relatively lightweight aluminum alloy type sheet metal material with a generally side facing rectangular inlet opening 150, generally corresponding to the mower deck discharge opening 112, and a generally rear facing outlet opening 152. It is contemplated that in some instances the discharge chute also may be advantageously made of molded plastic material or even eliminated in whole or in part by connecting the bag directly to a mounting bracket. A closed flow passage is defined by upper and lower generally flat parallel wall portions 154, 156 connected by a rounded outer side wall portion 158, having a substantially semi-cylindrical cross-sectional configuration, and overlapping flap portions 160, 162 secured by suitable fastening means 164. In this manner, the chute may be formed on a bending die from one piece of suitably blanked sheet material. A rectangular mounting flange 165 extends from the upper wall portion 154 beyond the inlet opening 150 and includes two sets of spaced attachment holes 166, 167, FIG. 9, of different diameters. Preferably, the flange 165, which provides abutment surface means, extends at an angle relative to the upper wall portion 154 so that when the flange is mounted in a horizontal position on the blade housing, the upper and lower wall portions will extend upwardly and rearwardly at an angle of approximately between 30° and 45°, FIG. 18. Bag attaching means, in the illustrative form of flanges 168, 169, may be provided adjacent the chute outlet opening to prevent inadvertent removal of the bag under load. The chute is formed so that at least the outermost portion of the outlet opening 152 is substantially elevated relative to the inlet opening 150 by the outward, rearward and upward inclination of top and bottom surfaces 154, 156.

The bag and chute support means 106 comprises a series of telescopically connected tubular members including a double bend front tube member 170, an intermediate straight tube member 172, a first single bend rear tube member 174, and a second double bend rear tube member 176. The front portion 178 of member 170 extends substantially vertically, in the catching position of FIG. 8, and is suitably fixedly attached, as by welding, to an attachment plate 180, FIG. 14, having two sets of spaced attachment holes 182, 184, which correspond in location and size to holes 166, 167 in chute flange 165. Suitable fastening means 186 extend through each of the pairs of aligned holes 167, 184, to securely fixedly fasten the attachment plate 180 on the flange 165 such that the chute is fixed to and movable with the member 170. An intermediate portion 186 of member 170, FIG. 8, extends outwardly rearwardly and upwardly from vertical portion 170 and terminates in a generally rearwardly upwardly extending straight portion 188.

The intermediate support member 172 is of the same tubular size as the front member 170 and has a swaged front end portion of reduced diameter (not shown) tightly telescopically extending into the open rear end of member 170 at 190. The rear end of member 172 is loosely slidably telescopically mounted at 192 within the open front end of member 174 which is of suitable larger tubular size. As shown in FIG. 15, a removable latch pin 194 may be attached to one end of a length of chain 196 for insertion through pairs of oppositely aligned holes 198, 200 in the ends of the members 172, 174 to releasably hold member 172 relative to member 174 against both axial and rotative displacement.

The rear end portion of member 174 is bent approximately 90° relative to the front end portion and has a tubular sleeve 202 carrying a stop flange 204 fixedly mounted thereon as shown in detail in FIG. 16.

Pivot shaft means in the form of a cylindrical shaft member 206 has one end portion telescopically mounted within the open rear end of member 174 and fixedly secured therein by any suitable means such as induction welding, brazing, soldering or the like. The other end portion of the shaft member extends beyond the end of the member 174 a substantial distance so as to be slidably rotatably receivable in the open end of member 176 which is of the same tubular size as member 174. A retaining groove 208 in shaft member 206 slidably receives the end of a threaded holding member 210, threadably received in a tapped hole in the end of member 176, to permit rotative movement of the shaft member 206 and member 174 relative to the member 176.

A latch means 212, mounted on an outwardly extending generally horizontal end portion 213 of support member 176, comprises a sleeve portion 214 fixedly mounted on the support member 176, as by welding, a combination latch pin cage and stop means in the form of an inverted U-shaped plate member 215, and a headed latch pin 216. The plate member 215 includes a pair of spaced vertically extending leg portions 217, connected by a horizontally extending web portion 218, fixedly mounted on the sleeve portion 214 by suitable means such as welding. The latch pin 216 is slidably mounted in a hole 220 in web portion 218 and is movable therein between a latched position, FIG. 16, extending through opposite pairs of aligned holes 222, 224, in the sleeve 214 and tube 176, respectively, and a hole 226 in shaft 206, and an unlatched position, FIG. 8, removed from the latch hole 226 with the lower end of the pin riding on a circumferentially spaced portion of the outer surface of the shaft. A cross pin 228 is mounted on an intermediate portion of latch pin 216 to form a stop preventing removal of the latch pin from the cage 215. The arrangement is such that the latch pin 216 rides loosely on the outside surface of shaft 206 during movement from the grass catching position of FIG. 8, and automatically drops by gravity into the latch hole 226 in the vertical dumping position of FIG. 9. Stop flange 204 is arranged to engage one of the leg portions 217 in the vertical dumping position to insure proper location of the latch hole 226 relative to the latch pin.

Member 176 has a generally vertically extending end portion 227 connected to the end portion 213 by a rearwardly upwardly outwardly extending intermediate portion 228 such that the horizontal pivotal axis provided by shaft 206 is located substantially rearwardly of the rear end of the mower and substantially upwardly of the mower frame. In the catching position of FIG. 8, the forwardly extending straight portions of the tubular support means 106 extend downwardly toward the chute 104. Thus the bottom rear end of the bag is located a substantial distance above the ground in the catching position even though the cross-section of the bag is greatest at the rear. In addition, in the vertical dumping position of FIG. 9, the rear end of the bag will be located a maximum distance from the ground to facilitate opening of the zipper and dumping into a container.

The open bottom end of the vertical end portion 227 of member 176 is slidably rotatably telescopically mounted over a vertically extending pivot post 230, FIG. 12, fixedly mounted on the mower frame by a plate 232 which is fixed between a leg portion 234 of member 114 and the mower frame by fastening means 116. A stop means in the form of a collar 236 and a pin 238, is fixedly mounted on end portion 227 so that the bottom of the collar engages the top of the plate while the side of the pin is engageable with the side of plate 232 in the catching position and side dumping position. A rear dumping position (not shown) is reachable by vertically lifting the member 176 until pin 238 clears the top edge of plate 232, then rearwardly rotating the entire grass catcher unit 90° in the direction of the arrow 240 on the pivot post 230 until pin 238 clears the side of the mower frame and then lowering the member 176 to again engage the bottom of the collar with the top of the plate.

The catcher bag is suspended from the support means 106 by three spaced hanger means in the form of eyebolts 242, 244, 246, which extend through suitably positioned sets of oppositely aligned holes in the tube members 170, 172 and 174, and suitable fastening devices such as nuts and lockwashers. The rear end of chain 196 may be fastened to member 174 by bolts 246. As shown in FIG. 10, the front and intermediate cross bar eyescrews 134 are preferably permanently interlocked with the eyebolts whereas the rear cross bar eyescrew 248, FIG. 15, is preferably removably mounted on eyebolt 246 which has a rearwardly facing open terminal portion 250 such that the eyelet of the eyescrew 248 may be placed over and removed from the terminal portion by rearwardly stretching and tensioning the bag to facilitate dumping of the bag on the mower or removal of the bag from the mower for dumping at a remote location.

The attachment bracket means 108, FIG. 11, comprises a one piece channel shaped sheet metal member having spaced upper and lower horizontal leg portions 260, 262 connected by a vertically extending web portion 264. The lower leg portion 262 is mounted in abutting engagement with the top surface of the mower blade housing 100 adjacent to and parallel with the discharge opening 112. Chute retaining abutment means in the form of a pair of internally threaded cap nut elements 266, 268 are fixed to the bottom leg portion 262 circumjacent aligned access holes (not shown) in the leg portion 262 and in the mower blade housing through which are inserted suitable fastening devices 270, 272 for threaded engagement with the cap nut elements. The upper leg portion 260 is centrally notched at 274 to loosely receive and confine the lower vertical end portion 178 in three directions in the chute attached position of FIG. 8 whereat the cap nuts 266, 268 are loosely received in and confined by the corresponding holes 182 in plate 180 and flange 165, FIG. 14. The bolt holes 184 are spaced outwardly of nut holes 182 a sufficient distance so as to locate the fastening means 186 beyond the edges of leg portion 262 whereby, in the chute attached position, the bottom of flange 165 rests flush on the upper surface of leg portion 262 of the attachment bracket 108 with the parallel aligned side edges of plate 180 and flange 165 loosely abutting or closely spaced adjacent side surface of web portion 264. In this manner, the chute is removably held on the mower blade housing while being sufficiently confined to prevent inadvertent disassociation and may be removed and replaced by the operator by simply vertically lifting the chute assembly relative to the attachment bracket 108 to clear the cap nut 266, 268 and then moving the chute assembly laterally outwardly beyond the cap nuts. The bracket serves as a stop to prevent inadvertent removal of the chute assembly during mowing by only vertical upward movement which may occur as a result of collision with fixed objects during use.

An alternative chute attachment arrangement is shown, in FIG. 17, to comprise mounting the end portion 178 of tube member 170 at the front end of attachment plate 180a with a pair of elongated aligned slots 280 centrally located in the plate 180 and chute flange 165. An attachment bracket 282 comprises a channel shaped member, having upper and lower horizontal leg portions 284, 286 connected by a vertical web portion 288, and chute retaining abutment means in the form of a vertically extending flange portion 290 centrally fixedly mounted on the lower leg portion 286 in horizontally spaced relationship to the web portion 288 and vertically spaced relationship to the upper leg portion 284. Thus, the vertical flange 290 is receivable in the slots 280 to removably hold the chute on the mower blade housing as previously described.

In operation in the grass catching position of FIG. 8, grass is thrown out of the discharge opening 112 of the mower blade housing in a stream of relatively high velocity air into the discharge chute 104 through chute inlet opening 150 and turned upwardly rearwardly by the walls of the chute for discharge into the bag 102 from chute outlet opening 152. The arrangement is such that the air stream and grass are directed toward the upper rear part of the bag so that the bag fills with grass from rear to front with the air escaping through the porous bag material at the rear and along the upper wall of the bag as the bag fills. A relatively large bag may be used of four to five bushel capacity which can relatively easily hold as much as 50 pounds of grass. The bag is centrally located relative to the support tubing and free to swing somewhat relative thereto due to the pivotal type connection provided by the eyescrew — eyebolt hanger means but the spacing of the hanger means is such as to insure spreading and tensioning of the upper bag surface. The catcher unit has the advantage that it is inherently capable of absorbing relatively high shock forces as may be encountered as a result of collision with trees, shrubbery, buildings, or the like, due to the relatively loose mounting of the chute on the mower, the swinging movement of the bag relatively to the support tubing and the chute, the pivotal mounting of the support members 170, 172, 174 relative to the member 176, and the pivotal mounting of member 176 on shaft 230 on the mower frame.

Another advantage of the catcher unit is that the mower operator can reach the front member 170 while sitting on the mower seat, remove the chute from the mower blade housing by lifting and lateral outward movement, and partially raise the bag and chute by pivotal movement relative to member 176 which enables clearing of a clogged chute by shaking and/or elevating to cause the grass to move rearwardly into and in the bag. In addition, since much clogging often occurs at the discharge opening 112 of the blade housing, momentary removal of the chute will enable the mower blade to blow out any grass at the discharge opening. The arrangement is such that the mower operator can reach the inlet opening 150 of the chute while seated on the mower, after removing and raising the chute, so as to be able to push clogged grass through the chute into the bag if required. The arrangement also provides a safety feature since the mower operator does not need to ever place his hands anywhere near the discharge opening 112 of the blade housing 110.

In order to dump the grass from the bag, the operator has several choices which include: (1) dumping at the side of the mower in the vertical dumping position of FIG. 9 into (a) a rigid receptacle such as a standard refuse container or (b) into a collapsible plastic film type garbage bag held beneath or around the rear end of the catcher bar or (c) onto the ground or a cloth spread thereunder; (2) dumping at the rear of the mower in a vertical dumping position into a cart or trailer being pulled by the mower; or (3) dumping at a location remote from the mower by disassociation of the bag, chute and tubular support members 170, 172 from the mower and carrying of the bag to the remote location.

In order to dump the grass with the bag supported on the mower, the chute is removed from the attachment bracket on the mower blade housing and the bag is moved, by grasping the tubular support means 106, to the vertical dumping position by pivotal movement of member 174 relative to member 176. As the bag is moved into the vertical dumping position, stop flange 204 engages the front side of cage plate 215 and latch pin 216 drops into hole 226 in shaft 206 to automatically latch the member 174 relative to member 176 in the vertical dumping position. Then, the zipper 148 may be pulled to open the rear end of the bag to dump the grass although it is sometimes advantageous to pull the zipper open about half-way before moving the bag to the vertical position so that the weight of the grass will not interfere with opening of the zipper. A zipper flap on the inside of the bag may be advantageously employed, as previously described, to prevent grass from becoming caught in the zipper and to hold the grass in the bag during movement to the vertical position if the zipper is partially opened in the horizontal grass catching position. If it is desired to dump the grass into a rigid or collapsible container fitted closely around the rear end of the bag, it may be desirable to unhook the rear eyebolt 248 from the rear eyescrew 246 so that the bag is suspended only by the front and middle eyebolts 242, 244. In this manner, a collapsible container such as a plastic film garbage bag, can be fitted around the rear end portion of the catcher bag and the catcher bag can be shaken to facilitate dumping. If it is desired to dump the grass at the rear of the mower, the entire catcher unit can be pivoted about shaft 230 on the mower frame to the rear position and dumped into a trailer or cart pulled by the mower. Also, if the operator wishes to drive the mower along a path of narrower width than the mower and the side positioned catcher unit, the catcher unit may be moved to the rear position for travel along such a path.

In order to carry the bag away from the mower to a remote dumping location, the latch pin 194 is removed from the latch holes 198, 200 in tube members 172, 174 and the rear bag eyebolt 248 is disconnected from the rear tube eyebolt 246 while the catcher unit is supported in the horizontal grass catching position of FIG. 8. Then the operator may grasp the tube members 170, 172, disassociate the chute from the mower attachment bracket, and slide the rear end of tube member 172 out of telescopic engagement with the front end of tube member 174. In this manner, the bag and chute may be carried by tube members 170, 172 to the remote location without disassociating the bag from the chute or from the tube members 170, 172. In addition, the bag, the tube members 170, 172, and the chute are also easily disassociated from the mower for storage and it will be seen that rear support tube members 174, 176 may also be very easily disassociated from the mower as a unit for storage by simply lifting the bottom end portion of tube member 176 off of the support shaft 230.

As seen in FIGS. 8 and 9, in the presently preferred embodiment, the rear end of the bag is located forwardly of the horizontal pivotal axis provided by tube members 174, 176 and shaft 206 which has the advantage of locating the rear end of the bag a sufficient distance above the ground in the vertical dumping position to facilitate placement of a container thereunder while also serving as a protective bumper during reverse movement of the mower when engagement of the bag with an obstacle could cause problems such as disengagement of eyebolts 246, 248.

It is contemplated that the general principles hereinbefore disclosed may be otherwise variously embodied. For example, the principles may be applied to other kinds and styles of mowers including hand propelled walking type mowers. Furthermore, a plastic container or the like may be substituted for the cloth bag and the entire unit might be made from plastic. Also, the location of the catcher may be varied to adapt to various other kinds of mowers, such as those having top or rear discharge openings, and the catcher unit may be otherwise pivotally connected to the mower. Thus, it is intended that the appended claims be construed to cover variations of the illustrative embodiment except insofar as limited by the prior art.

I claim:

1. Apparatus for catching grass clippings or the like upon being discharged from a discharge opening of a power operated lawn mower comprising:

a container having an inlet opening at the front end for receiving the grass clippings and a storage space therewithin for accumulating the grass clippings and an outlet opening at the rear end for dumping the grass clippings;

rigid support means for holding the container in fixed relationship to the mower in a substantially horizontal catching position; and pivotal connecting means between the container and the mower enabling movement of the container between the catching position and a substantially vertical dumping position, said pivotal connecting means being located outwardly beyond said mower and above said container adjacent the rear end of said container whereby the rear end of said container is located a substantial distance upwardly above and beyond the mower and above the ground in the dumping position to enable the grass clippings to be discharged through the outlet opening at the rear end of said container into a disposal container positioned thereunder, the weight of said container and the grass clippings contained therein being supported by said mower in the vertical dumping position.

2. The invention as defined in claim 1 and the rear end of said support means being connected to the mower rearwardly of and in spaced relationship to the discharge opening of the mower and the front end of said support means being held in cantilever fashion adjacent and in spaced relationship to and above the mower and the discharge opening.

3. The invention as defined in claim 2 and said container being suspended below said support means and having a laterally outwardly extending chute at the forward end cooperable with the mower discharge opening to receive the grass clippings.

4. The invention as defined in claim 3 and said container having an openable and closable fastening means associated with the outlet opening at the rear end through which the grass clippings may be dumped.

5. The invention as defined in claim 4 and wherein said container comprises a limp collapsible cloth-like bag.

6. The invention as defined in claim 5 and wherein the outlet opening at the rear of said bag extending across the rear of the bag and forwardly along the side of the bag.

7. The invention as defined in claim 6 and having a downwardly and forwardly opening zipper means along said outlet opening.

8. The invention as defined in claim 7 and the periphery of said bag being larger at the rear end immediately adjacent said outlet opening to facilitate opening of said zipper and dumping through said outlet opening.

9. The invention as defined in claim 7 and there being a protective flap on the inside of the bag located to cover the zipper during filling of the bag.

10. The invention as defined in claim 1 and having a rigid discharge chute removably mounted on and supported by the mower about the discharge opening, the front end of said container being attached to the rear end of said discharge chute.

11. The invention as defined in claim 10 wherein said discharge chute having a support flange removably engaging the mower and supporting the front end of said support means on the mower.

12. The invention as defined in claim 11 and said support means comprising an elongated tubular member extending upwardly and outwardly from the mower and attached to the discharge chute and the container to carry both.

13. Apparatus for catching grass or the like as discharged from a power mower of the type having a blade housing mounted between the front and rear ends thereof, a grass discharge opening in the housing, front and rear wheels for moving the mower in a grass cutting path along the ground, and comprising:

an elongated grass catcher container of limp collapsible cloth-like material carried by the mower in generally horizontally extending grass catching position, spaced top and side walls and a front and rear end correspondingly related to the front and rear ends of the mower and defining an elongated grass catching space therewithin, an inlet opening at the front end of the catcher container having a size and shape smaller than the cross sectional area of any rearwardly located portion of said space, an openable and closable outlet opening at the rear end of said catcher container having a size and shape greater than the catcher container inlet opening and the cross sectional area of any forwardly located portion of said space, manually operable fastening means associated with the catcher container outlet opening to permit selective opening and closing of said outlet opening, and rod attachment means located along the top wall of said catcher container, chute means extending outwardly, upwardly and rearwardly relative to said mower and connecting said catcher container to the discharge opening on said blade housing, a chute inlet opening at one end of said chute next adjacent said mower housing for receiving grass from the blade housing through the discharge opening and generally corresponding in size and shape to the mower discharge opening, a chute outlet opening at the other end of said chute remote from said mower housing for discharging grass from said chute into said catcher container, a generally rearwardly and upwardly extending rear end portion of said chute defining said outlet opening and extending within said catcher container through said catcher container inlet opening and locating the chute outlet opening rearwardly of the front end of the catcher container, container supporting means on rear end portions of said chute telescopically receiving the front end portion of said catcher container and defining a closed air and grass discharge passage extending from said mower discharge opening through said chute to said space in said container, load bearing means on said chute adjacent said inlet opening engageably aligned with and overextending the blade housing above said discharge opening, a downwardly facing elongated generally flat load bearing surface on said chute beneath said load bearing means and forming part of the chute inlet opening, an upwardly facing elongated generally flat load bearing surface on said blade housing above said discharge opening and supportively receiving said downwardly facing load bearing surface on said chute, rod-like elongated generally rearwardly and upwardly extending catcher container and chute supporting means fixedly attached to said catcher container and chute whereby said catcher container and chute are movable as a unit relative to the mower, a rear section of said rod-like means extending generally parallel to the longitudinal axis of said catcher container from end to end of said catcher container and being generally centrally located between the side walls of said catcher container and spaced above the top wall of said catcher container, catcher container connecting means on said rear section of said rod-like means connectively associated with said rod attachment means on said catcher container, a front section of said rod-like means extending generally parallel to the longitudinal axis of said chute above and from end to end thereof, a terminal portion of said front section being fixedly attached to said chute adjacent the chute inlet opening, the rear end section being higher than the front end section and being located vertically a substantial distance above said blade housing and said chute whereby to hold the bottom of said catcher container in vertically spaced relationship above the ground in the grass catching position, upwardly and outwardly extending rod-like support arm means supportively mounted on a rear portion of said mower, a lower terminal portion of said support arm means being mounted in load bearing relationship with the mower, a first intermediate portion of said support arm means extending generally vertically relative to the mower, a second intermediate portion of said support arm means extending generally horizontally outwardly away from the mower toward said catcher container and said rod-like support means, an upper terminal portion of said support arm means being located in closely spaced relationship to said rod-like support means adjacent the rear end of said catcher container, pivotal connecting means between said rod-like support means and said rod-like support arm means located adjacent the rear end of said catcher container in upwardly and outwardly spaced relationship to the mower whereby said catcher container and said chute are movable from the generally horizontally extending grass catching position to a generally vertically extending grass dumping position whereat said chute is completely disassociated from said blade housing and the rear of said catcher container is vertically spaced above the ground a greater distance than the bottom of the catcher container is spaced above the ground in the grass catching position and the vertical distance between the rear end of the container and the ground is sufficient to enable a disposal container to be placed thereunder whereby the fastening means is operable to the open position to permit grass caught in said catcher container to be vertically dumped through the rear end of the catcher container into the disposal container.

14. The invention as defined in claim 13 and having: latching means operative in the vertically dumping position to latch said rod-like support means relative to said rod-like support arm means.

15. The invention as defined in claim 13 and having: chute attaching means operative in the horizontal grass catching position to hold said chute relative to said blade housing.

16. The invention as defined in claim 13 and having: disengageable connecting means between said rod-like support means and said rod-like support arm means whereby said rod-like support means and said container and said chute may be removed from said mower as a unit for remote dumping of grass.

17. Apparatus for catching grass or the like as discharged from a power mower of the type having a blade housing mounted between the front and rear ends thereof, a grass discharge opening in the housing, front and rear wheels for moving the mower in a grass cutting path along the ground, and comprising:

an elongated grass catcher container carried by the mower in generally horizontally extending grass catching position, an inlet opening at the front end of the catcher container associated with the discharge opening to receive grass therefrom, an openable and closable outlet opening at the rear end of said catcher container having a size and shape greater than the catcher container inlet opening, upwardly and outwardly extending rod-like support arm means supportively mounted on said mower, a lower terminal portion of said support arm means being mounted in load bearing relationship with the mower, a first intermediate portion of said support arm means extending generally vertically relative to the mower, a second intermediate portion of said support arm means extending generally horizontally outwardly away from the mower toward said catcher container, an upper terminal portion of said support arm means being located in closely spaced relationship to the rear end of said catcher container, pivotal connecting means between said rod-like support arm means and said catcher container located adjacent the rear end of said catcher container in upwardly and outwardly spaced relationship to the mower whereby said catcher container is movable from the generally horizontally extending grass catching position to a generally vertically extending grass dumping position whereat said catcher container is completely disassociated from said blade housing and the rear of said catcher container is vertically spaced above the ground a greater distance than the bottom of the catcher container is spaced above the ground in the grass catching position and the vertical distance between the rear end of the container and the ground is sufficient to enable a disposal container to be placed thereunder to permit grass caught in said catcher container to be vertically dumped through the rear end of the catcher container into the disposal container.

18. Apparatus for catching grass or the like as discharged from a power mower of the type having a blade housing mounted between the front and rear ends thereof, a grass discharge opening in the housing, front and rear wheels for moving the mower in a grass cutting path along the ground, and comprising:

an elongated grass catcher container carried by the mower in generally horizontally extending grass catching position, an inlet opening at the front end of the catcher container associated with the discharge opening to receive grass therefrom, an openable and closable outlet opening at the rear end of said catcher container having a size and shape greater than the catcher container inlet opening, rod attachment means located along the top wall of said catcher container, chute means extending outwardly and upwardly relative to said mower and connecting said catcher container to the discharge opening on said blade housing, load bearing means on said chute adjacent said inlet opening supportively mounted on the blade housing, rod-like elongated generally outwardly and upwardly extending catcher container and chute supporting means fixedly attached to said catcher container and chute whereby said catcher container and chute are movable as a unit relative to the mower, catcher container connecting means on said rod-like means connectively associated with said rod attachment means on said catcher container, a front section of said rod-like means extending generally parallel to the longitudinal axis of said chute above and from end to end thereof, a terminal portion of said front section being fixedly attached to said chute adjacent the chute inlet opening, upwardly and outwardly extending rod-like support arm means supportively mounted on a rear portion of said mower, a lower terminal portion of said support arm means being mounted in load bearing relationship with the mower, a first intermediate portion of said support arm means extending generally vertically relative to the mower, a second intermediate portion of said support arm means extending generally horizontally outwardly away from the mower toward said catcher container and said rod-like support means, an upper terminal portion of said support arm means being located in closely spaced relationship to said rod-like support means adjacent the rear end of said catcher container, pivotal connecting means between said rod-like support meand and said rod-like support arm means located adjacent the rear end of said catcher container in upwardly and outwardly spaced relationship to the mower whereby said catcher container and said chute are movable from the generally horizontally extending grass catching position to a generally vertically extending grass dumping position whereat said chute is completely disassociated from said blade housing and the rear of said catcher container is vertically spaced above the ground a greater distance than the bottom of the catcher container is spaced above the ground in the grass catching position and the vertical distance between the rear end of the container and the ground is sufficient to enable a disposal container to be placed thereunder to permit grass caught in said catcher container to be vertically dumped through the rear end of the catcher container into the disposal container.

19. The combination of a riding type mower and a grass catcher unit mounted thereon for movement between a generally longitudinally extending catching position and a generally vertically extending dumping position and comprising:

a mower frame supporting the mower components spaced front and rear wheels mounted on the frame for transporting the mower, a blade housing mounted on the frame intermediate the front and rear wheels, a discharge opening in the blade housing, an operator seat mounted on the frame intermediate the front and rear wheels, chute attachment bracket means fixedly mounted on the blade housing adjacent the discharge opening, discharge chute means removably associated with said bracket means and supported in part thereby, a container having an inlet opening mounted about said discharge chute means and extending rearwardly therefrom and having a selectively openable and closable outlet opening at the rear of the container, support arm means having a front portion attached to the chute and an intermediate and rear portions attached to the container, vertically extending pivot post means mounted on the frame at the rear of the mower, pivot arm means pivoted on the pivot post means and extending upwardly and outwardly relative to the mower, and pivotal connecting means between the outermost portion of said pivot arm means and the rear portion of said support arm means pivotally supporting said support arm means relative to said pivot arm means whereby the chute means and the container and the support arm means are movable as a unit between the catching portion, whereat said chute means is supportively associated with said bracket means on the blade housing, and the dumping position with said chute means removed from said bracket means and located in general vertical alignment with and above said inlet opening and said outlet opening of said container.

20. The invention as defined in claim 19 and further comprising:
latch means associated with said support arm means and said pivot arm means and being operative in the dumping position to latch the support arm means relative to the pivot arm means.

21. The invention as defined in claim 20 and wherein said latch means comprises:
pin means vertically mounted on said pivot arm means for movement between a latched position and an unlatched position,
rotatable pin receiving means connected to said support arm means and located in alignment with and receiving said pin means only in the dumping position,
bracket means movably supporting said pin means, and
handle means on said pin means for grasping by the operator to vertically pull the pin means to the unlatched position,
the pin means being operated to the latched position by gravity upon reaching the dumping position.

22. The invention as defined in claim 21 and further comprising:
stop means associated with said support arm means and said pivot arm means and engageable in the dumping position to positively align said pin means with said pin receiving means.

23. The invention as defined in claim 19 and wherein:
a portion of said support arm means being located in close enough proximity to said seat whereby a mower operator seated thereon is able to reach said portion and lift said chute means and pivotally upwardly displace said support arm means and said container a sufficient distance to assist in unclogging of the unit.

24. The invention as defined in claim 19 and wherein said bracket means comprises:
vertically extending abutment means,
slot means on said chute means alignable with said vertically extending abutment means and said abutment means being received in said slot means in the catching position, and
horizontally extending abutment means extending above said vertically extending abutment means over a portion of said chute means in the catching position to limit vertical displacement of said chute means and defining a laterally outwardly opening removal slot through which said portion of said chute means is laterally movable to engage and disengage said slot means with said vertically extending abutment means.

25. The invention as defined in claim 24 and wherein said bracket means further comprises:
a channel shaped member having a horizontal bottom wall and a vertical side wall and a horizontal top wall defining a laterally outwardly facing elongated access opening,
said vertical extending abutment means being mounted on said lower wall in outwardly spaced relationship to said side wall, and
said longitudinally extending abutment means being defined by said upper wall.

26. The invention as defined in claim 25 and said bracket means further comprising:
a laterally outwardly facing notch in said upper wall, and
a portion of said support arm means being received in and partially confined by said notch in the catching position.

27. The invention as defined in claim 26 and said vertically extending abutment means comprising:
a pair of spaced post means mounted on said lower wall and extending upwardly therefrom and terminating in vertically spaced relationship to said upper wall and being laterally outwardly spaced from said side wall and being located on opposite sides of said notch, and
a pair of openings in said portion of said chute means aligned with and receiving said post means in the catching position.

28. The invention as defined in claim 19 and further comprising:
stop means associated with said pivot arm means to releasably hold said pivot arm means in a first dumping position with said container located at the side of the mower and in a second dumping position with said container located behind the rear end of the mower.

29. The invention as defined in claim 19 and wherein:
said support arm means comprising telescopically mounted tubular members,
there being a front tubular member fixed attached at the forward end to said chute means and having a first vertically extending portion and a second outwardly upwardly extending portion and a third rearwardly extending portion,
a second tubular member portion telescopically associated with the rearwardly extending portion of said first tubular member,
a third tubular member having a front portion slidably telescopically associated with said second tubular member, and
removable latch means associated with said second tubular member and said third tubular member to permit said chute and said first tubular member and said second tubular member and said container to be disassociated from said third tubular member and carried away from the mower as a unit for dumping at a remote location.

30. The invention as defined in claim 29 wherein said latch means comprising:
alignable openings in the telescopically mounted portions of said second tubular member and said third tubular member, and
pin means receivable in said alignable openings, 31. The invention as defined in claim 19 and said container comprising:
a cloth-like bag of woven material, having a flat upper surface extending from front to rear thereof,
longitudinally spaced spreader means mounted in the bag and extending transversely across the bag from side to side of the flat upper surface, hanger means connected to said spreader means centrally of the upper surface of said bag and extending vertically upwardly therefrom, said support arm means extending centrally along and above the upper surface of said bag, and spaced mounting means on said support arm means connected to said hanger means to hold the upper surface of the bag in spread tensioned relationship to said support arm means.

32. The invention as defined in claim 31 and wherein: the cross-sectional area of said bag being greatest at the rear of the bag and decreasing toward the front end of the bag, and said spreader means having variable lengths and increasing in lengths from front to rear of the bag.

33. The invention as defined in claim 31 and wherein: the hanger means for the rearward most of said spreader means is removably connected to the associated one of said mounting means.

34. The invention as defined in claim 31 and wherein: there being a pivotal connection between said hanger means and said mounting means permitting limited swinging movement of said bag relative to said support arm means.

35. The invention as defined in claim 3, said chute comprising:

a passage for carrying the grass from the discharge opening to the container, an inlet opening for the passage generally corresponding in size and shape to the discharge opening, and rigid flange means on said chute extending laterally above and beyond said inlet opening for supportive engagement with the mower in the catching position.

36. The invention as defined in claim 35 and wherein: the upper wall portion extending along and defining the upper portion of said passage, said flange means being an integral extension of said top wall portion.

37. The invention as defined in claim 36 and further comprising:

a mounting plate member generally corresponding in size and shape to said flange means and being fixedly mounted on the upper surface of said flange means, and said support means having a vertically extending terminal portion fixedly mounted on said plate member.

38. The invention as defined in claim 37 and wherein the walls of said chute member are made only of one continuous integral piece of sheet material.

39. The invention as defined in claim 38 and wherein the material is a molded plastic polymer type material.

40. The invention as defined in claim 38 and wherein the material is a formed sheet metal material.

41. The invention as defined in claim 40 and wherein said chute member further comprising:

a lower wall portion extending along and defining the bottom portion of said passage, an outer side wall portion connecting said upper wall portion and said lower wall portion, said upper side wall portion and said lower side wall portion being generally flat and parallel to one another, and said outer side wall portion having a substantially semi-cylindrical cross-sectional configuration and connecting said upper wall portion and said lower wall portion.

42. The invention as defined in claim 41 and said chute further comprising:

an outlet opening at the end of said passage opposite said inlet opening, said upper wall portion and said lower wall portion being upwardly outwardly inclined relative to said flange means, and at least the portion of said outlet opening next adjacent said side wall portion being vertically upwardly spaced relative to said inlet opening.

43. The invention as defined in claim 42 and wherein said passage extends upwardly rearwardly at an angle of approximately between 30° and 45° and said outlet opening faces substantially transversely to said inlet opening.

44. The invention as defined in claim 3 and comprising:

an inlet opening in said chute generally corresponding in size and shape to the discharge opening, flange means fixed to said chute and extending laterally outwardly therefrom above and beyond said inlet opening, bracket means fixed to said mower above said discharge opening, and retaining means on said bracket means and said flange means cooperable to releasably hold said chute on said mower.

45. The invention as defined in claim 44 and wherein said mower comprising a blade housing, said discharge opening being located in said blade housing, and said bracket means comprising:

an elongated channel shaped member extending generally parallel to the discharge opening and having a bottom wall portion fixedly mounted on the top surface of the blade housing and a side wall portion extending vertically upwardly along the side edge of said lower wall portion furthest removed from said discharge opening and a top wall portion extending horizontally toward said discharge opening in parallel spaced relationship to said bottom wall portion and defining an elongated rectangular channel opening toward the discharge opening, abutment means mounted in said channel on said lower wall portion in horizontally spaced relationship to said side wall portion and in vertically spaced relationship to said top wall portion, and slot means in said flange means corresponding in size and shape and location to said abutment means, the vertical spacing between said upper wall portion and said abutment means being at least as great as the thickness of said flange means to permit said flange means to be inserted between said upper wall portion and said abutment means to align and latchably associate said slot means with said abutment means, the bottom surface of said flange means resting on the upper surface of said lower wall portion when the chute is attached to the blade housing.

46. The invention as defined in claim 45 and wherein said abutment means comprising a flange of rectangular cross-section.

47. The invention as defined in claim 45 and wherein said abutment means comprising a pair of spaced members of cylindrical cross-section.

48. The invention as defined in claim 45 and wherein:

said support means comprising a tubular support member having a vertically extending terminal portion fixedly connected to said flange means, and a notch in said upper wall portion generally corresponding in size and shape and location to said terminal portion, the terminal portion being received within said notch when the chute is attached to the blade housing.

49. The invention as defined in claim 48 and further comprising:

a support plate generally corresponding in size and shape to said flange means and being fixedly mounted on the top surface of said flange means, there being slot means in said plate corresponding to said slot means in said flange means, and said terminal portion of said tubular support member being fixedly mounted on said support plate.

50. The combination of a mower and a grass catcher unit removably mounted thereon in a generally horizontally extending catching position and comprising:

a mower frame supporting the mower components, wheel means mounted on the frame for transporting the mower, a blade housing mounted on the frame, a discharge opening in the blade housing, chute attachment bracket means fixedly mounted on the blade housing adjacent the discharge opening, discharge chute means removably associated with said bracket means and supported in part thereby, a container having an inlet opening mounted about said discharge chute and extending rearwardly therefrom, and said bracket means comprising:

vertically extending abutment means, slot means on said chute means alignable with said vertically extending abutment means and said abutment means being received in said slot means in the catching position, and horizontally extending abutment means extending above said vertically extending abutment means over a portion of said chute means in the catching position to limit vertical displacement of said chute means and defining a laterally outwardly opening removal slot through which said portion of said chute means is laterally movable to engage and disengage said slot means with said vertically extending means.

51. The invention as defined in claim 50 and wherein said bracket means further comprises:

a channel shaped member having a horizontal bottom wall and a vertical side wall and a horizontal top wall defining a laterally outwardly facing elongated access opening, said vertical extending abutment means being mounted on said lower wall in outwardly spaced relationship to said side wall, and said longitudinally extending abutment means being defined by said upper wall.

52. The invention as defined in claim 25 and further comprising:

support arm means having a front portion attached to said chute means and a rear portion attached to and supporting said container, a laterally outwardly facing notch in said upper wall, and a portion of said support arm means being received in and partially confined by said notch in the catching position.

53. The invention as defined in claim 52 and said vertically extending abutment means comprising:

a pair of spaced post means mounted on said lower wall and extending upwardly therefrom and terminating in vertically spaced relationship to said upper wall and being laterally outwardly spaced from said side wall and being located on opposite sides of said notch, and a pair of openings in said portion of said chute means aligned with and receiving said post means in the catching position.

54. In combination with a blade housing of a lawn mower or the like having a side facing discharge opening, a separate grass catcher chute for receiving grass from the side facing discharge opening in the blade housing of the lawn mower and comprising:

a main body portion of said chute having an inlet opening at one end and an outlet opening at the other end, spaced upper, lower and side walls of said main body portion defining a passage for carrying grass from said inlet opening to said outlet opening and extending therebetween, said inlet opening being defined by terminal portions of said side walls located laterally outwardly of and in spaced relationship to said blade housing and generally corresponding in size and shape to the discharge opening, laterally outwardly extending flange means fixedly attached to the upper walls of said main body portion of said chute and having abutment surface means located entirely above said blade housing and spaced outwardly of said inlet opening for supportive engagement by said blade housing enabling unrestricted upward movement of said chute relative to said blade housing, a mounting plate member generally corresponding in size and shape to said flange means and being fixedly mounted on the upper surface of said flange means, and a tubular support member for said chute having a vertically extending terminal portion fixedly mounted on said plate member.

55. The invention as defined in claim 54 and wherein the walls of said chute member are made only of one continuous integral piece of sheet material.

56. The invention as defined in claim 55 and wherein the material is a molded plastic polymer type material.

57. The invention as defined in claim 55 and wherein the material is a formed sheet metal material.

58. In combination:

a lawn mower having a blade housing with a side facing discharge opening, a grass catcher chute removably mounted on said blade housing in association with said discharge opening, an inlet opening in said chute generally corresponding in size and shape to the discharge opening, flange means fixed to said chute and extending laterally outwardly therefrom above and beyond said inlet opening, an elongated channel shaped member extending generally parallel to the discharge opening and having a bottom wall portion fixedly mounted on the top surface of the blade housing and a side wall portion extending vertically upwardly along the side edge of said lower wall portion furthest removed from said discharge opening and a top wall portion extending horizontally toward said discharge opening in parallel spaced relationship to said bottom wall portion and defining an elongated rectangular channel opening toward the discharge opening, abutment means mounted in said channel on said lower wall portion in horizontally spaced relationship to said side wall portion and in vertically spaced relationship to said top wall portion, and slot means in said flange means corresponding in size and shape and location to said abutment means, the vertical spacing between said upper wall portion and said abutment means being at least as great as the thickness of said flange means to permit said flange means to be inserted between said upper wall portion and said abutment means to align and latchably associate said slot means with said abutment means, the bottom surface of said flange means resting on the upper surface of said lower wall portion when the chute is attached to the blade housing.

59. The invention as defined in claim 58 and wherein said abutment means comprising a flange of rectangular cross-section.

60. The invention as defined in claim 58 and wherein said abutment means comprising a pair of spaced members of cylindrical cross-section.

61. The invention as defined in claim 58 and further comprising:
a tubular support member having a vertically extending terminal portion fixedly connected to said flange means, and
a notch in said upper wall portion generally corresponding in size and shape and location to said terminal portion,
the terminal portion being received within said notch when the chute is attached to the blade housing.

62. The invention as defined in claim 61 and further comprising:
a support plate generally corresponding in size and shape to said flange means and being fixedly mounted on the top surface of said flange means, there being slot means in said plate corresponding to said slot means in said flange means, and
said terminal portion of said tubular support member being fixedly mounted on said support plate.

* * * * *